United States Patent
Wang et al.

(10) Patent No.: US 7,664,205 B2
(45) Date of Patent: Feb. 16, 2010

(54) FREQUENCY-SHIFT-KEYING DEMODULATOR AND METHOD OF FREQUENCY-SHIFT-KEYING

(75) Inventors: Zhaocheng Wang, Stuttgart (DE); Masahiro Uno, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 616 days.

(21) Appl. No.: 11/237,342

(22) Filed: Sep. 28, 2005

(65) Prior Publication Data

US 2006/0067433 A1    Mar. 30, 2006

(30) Foreign Application Priority Data

Sep. 30, 2004    (EP)    ................................ 04023342

(51) Int. Cl.
H03D 3/00    (2006.01)
H04L 27/14    (2006.01)
H04L 27/06    (2006.01)

(52) U.S. Cl. .................. 375/334; 375/340; 329/300

(58) Field of Classification Search ............... 375/272, 375/274, 275, 334, 335, 336, 271, 279–281, 375/320, 322–324, 329–333, 340, 273; 329/300, 329/303, 315, 336, 304, 311, 345, 347; 455/42, 455/205, 214, 337
See application file for complete search history.

(56) References Cited

U.S. PATENT DOCUMENTS

| | | | | |
|---|---|---|---|---|
| 4,388,595 | A * | 6/1983 | Brooks | ........................ 329/336 |
| 4,435,682 | A | 3/1984 | Boudault et al. | |
| 4,485,448 | A * | 11/1984 | Kurth | ......................... 375/334 |
| 4,652,775 | A | 3/1987 | Daudelin | |
| 5,056,122 | A * | 10/1991 | Price | .......................... 329/304 |
| 5,162,791 | A * | 11/1992 | Heegard | ..................... 375/333 |
| 6,121,829 | A | 9/2000 | Tokura | |
| 6,993,301 | B1 * | 1/2006 | Kenington et al. | ........ 455/114.3 |

FOREIGN PATENT DOCUMENTS

JP    58-13055    1/1983

OTHER PUBLICATIONS

Larkin K G: "Efficient demodulator for bandpass sampled AM signals" Electronics Letters, IEE STEVENAGE, GB, vol. 32, No. 2, Jan. 18, 1996, pp. 101-102, XP006004591.
Komurasaki, Hiroshi et al., "A 1.8-V Operation RF CMOS Transceiver for 2.4-GHz-Band GFSK Applications," IEEE Journal of Solid-State Circuits, vol. 38, No. 5, May 2003, pp. 817-825.
Byun, Sangjin et al., "A Low-Power CMOS Bluetooth RF Transceiver With a Digital Offset Canceling DLL-Based GFSK Demodulator," IEEE Journal of Solid-State Circuits, vol. 38, No. 10, Oct. 2003, pp. 1609-1618.

* cited by examiner

Primary Examiner—Betsy L Deppe
(74) Attorney, Agent, or Firm—Oblon, Spivak, McClelland, Maier & Neustadt, L.L.P.

(57) ABSTRACT

A frequency-shift-keying demodulator including a phase shifter for shifting the phase of an input signal by a predetermined degree and outputting a shifted signal, a combining unit for combining the input signal and the shifted signal and for outputting a corresponding signal, and a low-pass filter for filtering the signal output by the combining unit and outputting a low-pass filtered signal, the bandwidth of the low-pass filter being matched with the bandwidth of a data signal included in the input signal, such that the combining unit includes at least one adder for adding the input signal and the shifted signal, and outputting an added signal, and at least one square law detector for receiving the added signal output by the adder and outputting a squared signal which is the square of the added signal, wherein the combining unit outputs the squared signal to the low-pass filter.

6 Claims, 4 Drawing Sheets

FREQUENCY-SHIFT-KEYING DEMODULATOR AND METHOD OF FREQUENCY-SHIFT-KEYING

BACKGROUND

The present invention relates to a frequency-shift-keying demodulator comprising the features of the preamble of independent claim 1 and to a method of frequency-shift-keying demodulating an input signal comprising the steps of the preamble of independent claim 7.

In order to reduce the power consumption of a power amplifier for wireless communication from a transmitter side and to realise bandwidth efficient wireless transmission, various continuous phase frequency-shift-keying (FSK) type modulation schemes are known. For example, minimum shift keying (MSK) and Gaussian frequency shift keying (GFSK) are widely used in wireless communication systems, e.g. according to the GSM or Bluetooth standard.

With respect to demodulation of a signal, frequency discriminators or FM-AM converters are the most popular forms of demodulators due to their simplicity.

In the following, a receiver and a demodulator for frequency-shift-keying modulation according to the prior art is described by reference to FIGS. 1 and 2.

FIG. 1 shows a conventional receiver architecture comprising an antenna 20 for reception of transmitted signals.

The antenna 20 is connected via an RF-bandpass filter 16 and a low-noise-amplifier 17 to a mixer 21.

The mixer 21 multiplies the signal received by the antenna 20 with a signal generated by a local oscillator LO to down-convert the signal to intermediate frequency (IF).

The IF signal further goes from the mixer 21 via a channel selection filter 18 and a further amplifier 19 to a conventional frequency-shift-keying FSK demodulator 11. The frequency-shift-keying demodulator 11 receives a FSK input signal i(t).

The differential frequency-shift-keying demodulator 11 demodulates the FSK input signal i(t) and outputs a low-pass filtered output signal $r_{LP}(t)$.

FIG. 2 shows the internal structure of a differential frequency-shift-keying demodulator according to the prior art.

The conventional differential frequency-shift-keying demodulator 11 shown in FIG. 2 consists of a phase shifter 12, a mixer 13 and a low-pass filter 15.

The input signal i(t) is supplied to both the phase shifter 12 and the mixer 13.

The phase shifter 12 shifts the phase of the input signal i(t) by a predetermined degree and outputs a shifted signal Id(t) to the mixer 13.

The mixer 13 multiplies the input signal i(t) and the shifted signal Id(t) and outputs a mixed signal r(t) to the low-pass filter 15.

The low-pass filter 15 low-pass filters the mixed signal r(t) and outputs a low-pass filtered signal $r_{LP}(t)$.

The FSK input signal i(t) of the above described differential frequency-shift-keying demodulator 11 can be written as $$i(t) = s(t) + n(t) = A\cos\left[2\pi f_i t + 2\pi h \int_{-\infty}^{t} m(\tau)d\tau\right] + n(t),$$

wherein A is the amplitude, $f_i$ is the carrier frequency, $m(\tau)$ is the filtered data signal, n(t) is additive white Gaussian noise (AWGN) and h is the modulation index of the signal i(t).

The modulation index h of the signal i(t) is defined as $h=2f_d T_s$ where $f_d$ is the frequency deviation and $T_s$ is the symbol duration.

The goal of the above-described differential frequency-shift-keying FSK demodulator 11 is to provide an output signal $r_{LP}(t)$ that is proportional to the instantaneous frequency of the input signal i(t).

The frequency response of the phase shifter 12 of the FSK demodulator 11 is $$\phi(f) = -\pi/2 + 2\pi K(f-f_i).$$

Thus, the output Id(t) of the phase shifter 12 is $$Id(t) = s_d(t) + n_2(t) = \\ A\cos\left[2\pi f_i t + 2\pi h \int_{-\infty}^{t} m(\tau)d\tau - \pi/2 + 2\pi Khm(t) + n_1(t)\right] + n_2(t)$$

where $n_1(t)$ and $n_2(t)$ are the noise terms generated by the phase shifter 12 due to the co-existence of n(t) in the input signal i(t).

The low-pass filtered signal $r_{LP}(t)$ output by the low-pass filter 15 after eliminating the double frequency terms is $$r_{LP}(t) = \\ \left(\frac{A^2}{2}\sin[2\pi Khm(t) + n_1(t)] + [s(t) \times n_2(t) + s_d(t) \times n(t) + n(t) \times n_2(t)]\right)\Big|_{LP}.$$

When the term $2\pi Khm(t)$ is small and the noise terms are negligible, the resulting low-pass filtered signal $r_{LP}(t)$ is $$r_{LP}(t) \approx \frac{A^2}{2} \cdot 2\pi Khm(t).$$

Thus, the transmitted data comprised in the input signal i(t) can be recovered correctly.

Corresponding differential frequency-shift-keying demodulators are described in the paper "A 1.8-V Operation RF CMOS Transceiver for 2.4-GHz-Band GFSK Applications" of Hiroshi Komurasaki, Tomohiro Sano et al. The paper was published in the IEEE journal of solid-state circuits, volume 38, no. 5, May 2003.

The above paper describes a single-chip RF transceiver LSI for 2.4-GHz-band Gaussian frequency-shift-keying applications, such as Bluetooth. This chip uses a 0.18 μm bulk CMOS process for lower current consumption. The LSI consists of almost all the required RF and IF building blocks, a transmit/receive antenna switch, a power amplifier, a low-noise-amplifier, an image rejection mixer, channel-selection filters, a limiter, a received signal strength indicator, a frequency discriminator, a voltage controlled oscillator, and a phase-locked loop synthesizer. The bandpass filter for channel selection operates at a low supply voltage. However, because large interference is roughly rejected at the output of the image rejection mixer and a wide-input-range bandpass filter with an optimized input bias is realized, the transceiver can operate at a supply voltage of 1.8 V.

Another differential frequency-shift-keying demodulator according to the prior art is described in the paper "A Low-Power CMOS Bluetooth RF Transceiver With A Digital Offset Cancelling DLL-Based GFSK Demodulator" published by Sangjin Byun, Yongchul Song, et al in the IEEE journal of solid-state circuits, volume 38, no. 10, October 2003.

This paper presents a fully integrated 0.18 μm CMOS Bluetooth transceiver. The chip consumes 33 mA in receive mode and 25 mA in transmit mode from a 3-V system supply. The receiver uses a low-IF (3-MHz) architecture, and the transmitter uses a direct modulation with ROM-based Gaussian low-pass filter and I/Q direct digital frequency synthesizer for high level of integration and low power consumption. A new frequency shift keying demodulator based on a delay-locked loop with a digital frequency offset canceller is proposed. The demodulator operates without harmonic distortion, handles up to ±160-kHz frequency offset, and consumes only 2 mA from a 1.8-V supply. The receiver dynamic range is from −78 dBm to −16 dBm at 0.1% bit-error rate, and the transmitter delivers a maximum of 0 dBm with 20-dB digital power control capacity.

It is a disadvantage with the above-described differential frequency-shift-keying demodulators according to the prior art that an active mixer is required to achieve a sufficient signal strength of the FSK signal. The active mixer requires a strong local oscillator (LO) signal that consumes much power for high frequencies (e.g. 60 GHz) applications.

Furthermore, mixers working at high frequencies (e.g. 60 GHz) are very complicated and thus expensive elements.

SUMMARY

It is the object of the present invention to provide a frequency-shift-keying demodulator and method of frequency-shift-keying demodulating an input signal that work with sufficient performance even at high frequencies and with an input signal having a low strength. Furthermore, the demodulator should be easy to implement and consist of simple and cheap elements.

The above object is solved in a frequency-shift-keying demodulator comprising the features of the preamble of independent claim 1 by the features of the characterising part of independent claim 1.

Furthermore, the above object is solved by a method of frequency-shift-keying demodulating an input signal comprising the steps of the preamble of independent claim 7 by the characterising part of independent claim 7.

Preferred embodiments are described in the dependent claims.

According to the present invention a frequency-shift-keying demodulator comprises a phase shifter for shifting the phase of an input signal by a predetermined degree and for outputting a shifted signal, a combining unit for combining the input signal and the shifted signal output by the phase shifter and for outputting a corresponding signal and a low-pass filter for filtering the signal output by the combining unit, the bandwidth of said low-pass filter being matched with the bandwidth of a data signal contained in said input signal, wherein said combining unit comprises at least one adder for adding the input signal and the shifted signal output by the phase shifter and for outputting an added signal and at least one square law detector for receiving the added signal output by the adder and for outputting a squared signal which is the square of the added signal, wherein the combining unit outputs the squared signal to the low-pass filter.

Thus, according to the present invention the mixer present in differential frequency-shift-keying demodulators according to the prior art is replaced by a simple adder and a following square law detector.

Therefore, the differential frequency-shift-keying demodulator according to the present invention uses the basic principle of frequency discrimination but does not require a mixer or multiplier for differential detection.

Furthermore, it is possible to realise the inventive frequency-shift-keying demodulator by using passive components, only. In consequence, the power consumption and the complexity of the demodulator can be reduced.

Furthermore, the structure of the inventive differential frequency-shift-keying demodulator allows usage of the demodulator in an RF part of a receiver architecture. Thus, no conversion of a signal from radio frequency RF to baseband BS is required. In consequence, a local oscillator and a corresponding mixer of the receiver architecture according to the prior art can be eliminated and the whole receiver architecture becomes more simple.

According to a preferred embodiment said combining unit comprises a first, second and third adder and a first and a second square law detector, wherein the first adder adds the input signal and the shifted signal output by the phase shifter and outputs a first added signal to the first square law detector, the first square law detector receives the first added signal output by the first adder and outputs a first square signal proportional to the square of the first added signal, the second adder subtracts the input signal from the shifted signal output by the phase shifter and outputs a second added signal to the second square law detector and the second square law detector receives the second added signal output by the second adder and outputs a second square signal proportional to the square of the second added signal. The third adder subtracts the second square signal output by the second square law detector from the first square signal output by the first square law detector and outputs a third added signal and the combining unit outputs the third added signal to the low-pass filter.

According to this preferred embodiment, the frequency-shift-keying demodulator comprises a balanced and simple architecture that can eliminate DC offsets in the signal and cancel the common mode noise introduced by square law detection while providing a good performance.

Preferably, the phase shifter shifts the phase of an input signal by $$-\frac{\pi}{2} \pm 2N\pi$$

at the carrier frequency of the input signal, where N is an integer.

According to a beneficial embodiment said phase shifter is a delay line.

Favourably, the second and third adder change the sign of a signal that has to be subtracted before adding said respective signal in order to subtract said respective signal.

According to an alternative embodiment said square law detector is a multiplier.

Moreover, according to the present invention the above object is solved by a method of frequency-shift-keying demodulating an input signal comprising the steps of:
  shifting the phase of an input signal by a predetermined degree and outputting a shifted signal;
  combining the input signal and the shifted signal and outputting a corresponding signal; and
  low-pass filtering the signal output by the combining step and outputting a low-pass filtered signal;

wherein the step of combining the input signal and the shifted signal and outputting a corresponding signal further comprises the steps of adding the input signal and the shifted signal and outputting an added signal; and
generating and outputting a squared signal which is the square of the added signal;
wherein said squared signal is filtered in the step of low-pass filtering the signal output by the combining step.

According to a preferred embodiment the step of combining the input signal and the shifted signal and outputting a corresponding signal further comprises
a first adding step of adding the input signal and the shifted signal and outputting a first added signal;
a step of generating and outputting a first squared signal proportional to the square of the first added signal;
a second adding step of subtracting the input signal from the shifted signal and outputting a second added signal;
a step of generating and outputting a second squared signal proportional to the square of the second added signal; and
a third adding step of subtracting the second squared signal from the first squared signal and outputting a third added signal;
wherein said third added signal is filtered in the step of low-pass filtering the signal output by the combining step.

Favourably, the step of shifting the phase of an input signal by a predetermined degree and outputting a shifted signal comprises shifting the phase of the input signal by $$-\frac{\pi}{2} \pm 2N\pi$$

at the carrier frequency of the input signal, where N is an integer.

Preferably, the second adding step and the third adding step comprise the step of changing the sign of a respective signal that has to be subtracted before adding said signal.

BRIEF DESCRIPTION OF THE DRAWINGS

In the following, the present invention is further explained by reference to the accompanying figures, in which like reference numbers refer to like parts throughout the figures. In the figures.

DETAILED DESCRIPTION

Figure 3:
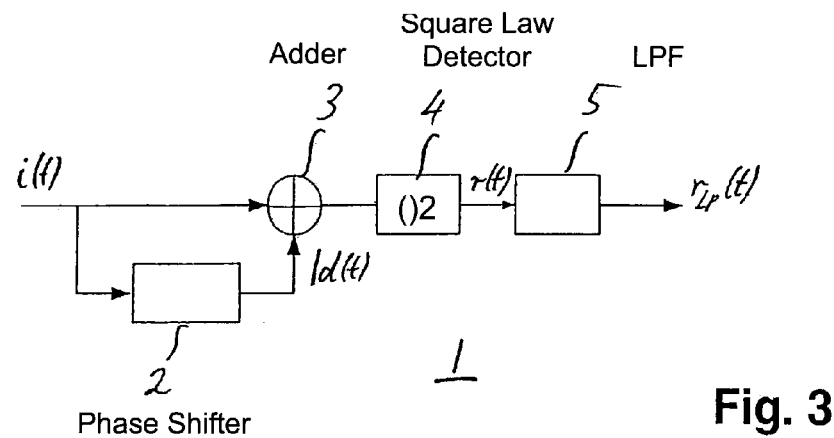
FIG. 3 shows a block diagram of a frequency-shift-keying demodulator according to a first embodiment of the present invention.

FIG. 3 shows a block diagram of a frequency-shift-keying demodulator 1 according to a first embodiment of the present invention.

The frequency-shift-keying demodulator 1 comprises a phase shifter 2, an adder 3, a square law detector 4 and a low-pass filter 5.

An input signal $$i(t) = s(t) + n(t) = A\cos\left[2\pi f_i t + 2\pi h \int_{-\infty}^{t} m(\tau)d\tau\right] + n(t)$$

is supplied to both the phase shifter 2 and the adder 3.

The phase shifter 2 shifts the phase of the input signal i(t) by a predetermined degree and outputs a shifted signal Id(t) to the adder 3.

The adder 3 adds the input signal i(t) and the shifted signal Id(t) received from the phase shifter 2 and outputs an added signal to the square law detector 4.

The square law detector 4 receives the added signal output by the adder 3 and outputs a square signal r(t). Said square signal r(t) is the square of the added signal output by the adder 3.

Thus, the adder 3 and the square law detector 4 constitute a combining unit for combining the input signal i(t) and the shifted signal Id(t) output by the phase shifter 2 and for outputting a corresponding signal r(t).

In the present embodiment, the square law detector 4 is realised by using a diode. In consequence, the square law detector 4 is a very cheap and simple passive element.

The square signal r(t) output by the square law detector 4 is provided to the low-pass filter 5 for low-pass filtering the signal r(t) and for outputting a low-pass filtered signal $r_{LP}(t)$. To allow a suitable filtering, the bandwidth of the low-pass filter is matched with the bandwidth of a data signal contained in the input signal i(t).

The output signal $r_{LP}(t)$ of the above described inventive frequency-shift-keying demodulator 1 is $$r_{LP}(t)=[s(t)+n(t)+s_d(t)+n_2(t)]^2|_{LP}=\text{item1}+\text{item2}+\text{item3}$$

where $$\text{item1} = 2 \cdot \left(\frac{A^2}{2}\sin[2\pi Khm(t) + n_1(t)] + [s(t) \times n_2(t) + s_d(t) \times n(t) + n(t) \times n_2(t)]\right)\bigg|_{LP}$$

$$\text{item2} = (s^2(t) + s_d^2(t))|_{LP}$$

$$\text{item3} = [2 \cdot s(t) \times n(t) + 2 \cdot s_d(t) \times n_2(t) + n^2(t) + n_2^2(t)]|_{LP}$$

Item1 corresponds to the output of a conventional differential frequency-shift-keying demodulator according to the prior art.

Item2 after low-pass filtering indicates that a DC offset is introduced since i(t) and Id(t) are constant envelope frequency-shift-keying modulated signals.

Item3 is the enhanced noise comprised in the output signal $r_{LP}(t)$.

In addition, after channel selection filtering there is a small amplitude fluctuation for i(t) and thus a small AM modulation effect exists due to item2. Since the spectrum of said fluctuation signal is within the bandwidth of the modulated data, it cannot be eliminated.

In summary, according to the present invention, the mixer of the differential frequency-shift-keying demodulator according to the prior art is replaced by a simple adder 3 and a following square law detector 4.

Therefore, the differential frequency-shift-keying demodulator 1 according to the present invention uses the basic principle of frequency demodulation but does not require a mixer or multiplier for differential detection while maintaining a good sensitivity.

Furthermore, the structure of the inventive differential frequency-shift-keying demodulator 1 allows usage of the demodulator 1 in an RF part of a receiver architecture. Thus, no conversion of a signal from radio frequency RF to baseband BS is required. In consequence, a local oscillator and a corresponding mixer of the receiver architecture according to the prior art can be eliminated and the whole receiver architecture becomes more simple.

Figure 4:
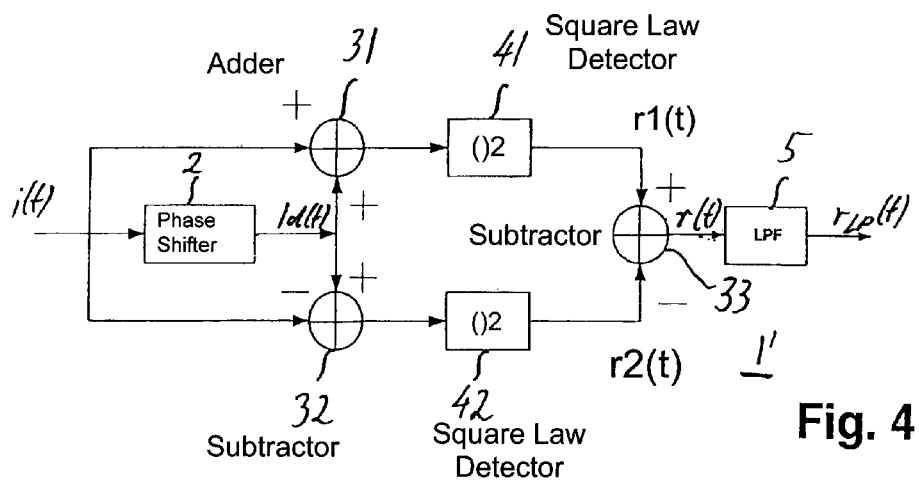
FIG. 4 shows a block diagram of a second embodiment of a frequency-shift-keying demodulator according to the present invention.

The second preferred embodiment of the inventive frequency-shift-keying demodulator 1' is adopted to cancel the corresponding DC-offset and to eliminate the corresponding enhanced noise item. FIG. 4 shows a block diagram of a second preferred embodiment of the inventive frequency-shift-keying demodulator 1'.

This frequency-shift-keying demodulator 1' can be realised by using passive components, only. Therefore, the power consumption and the complexity of the demodulator 1' is very low.

According to this embodiment, the inventive frequency-shift-keying demodulator 1' comprises a first, second and third adder 31, 32 and 33, a first and a second square law detector 41, 42, a phase shifter 2 and a low-pass filter 5.

An inputted signal i(t) is supplied to the phase shifter 2 and the first and second adders 31 and 32.

The phase shifter 2 shifts the phase of the input signal i(t) by $$-\frac{\pi}{2} \pm 2N\pi,$$

where N is an integer, at the carrier frequency of the input signal i(t) and outputs a shifted signal Id(t) to the first and second adders 31 and 32, respectively. In the present embodiment, the phase shifter 2 is a delay line.

The first adder 31 adds the input signal i(t) and the shifted signal Id(t) output by the phase shifter 2 and outputs a first added signal to the first square law detector 41.

Based on the first added signal received from the first adder 31 the first square law detector 41 outputs a first square signal $r_1(t)$ to the third adder 33. The first square signal $r_1(t)$ is the square of the first added signal.

The second adder 32 changes the sign of the input signal i(t) and adds the amended input signal to the shifted signal Id(t) output by the phase shifter 2 to subtract the input signal i(t) from the shifted signal Id(t). The second adder 32 outputs a second added signal to the second square law detector 42.

Based on the second added signal output by the second adder 32 the second square law detector 42 generates and outputs a second square signal $r_2(t)$ to the third adder 33. Said second square signal $r_2(t)$ is the square of the second added signal.

The third adder 33 receives both the first square signal $r_1(t)$ and the second square signal $r_2(t)$ from the first and second square law detector 41 and 42, respectively.

The third adder 33 changes the sign of the second square signal $r_2(t)$ and adds this changed signal to the first square signal $r_1(t)$ to subtract the second square signal $r_2(t)$ from the first square signal $r_1(t)$. Based on the respective result the third adder 33 outputs a third added signal r(t) to the low-pass filter 5.

The low-pass filter 5 filters the third added signal r(t) received from the third adder 33 and outputs a low-pass filtered signal $r_{LP}(t)$.

According to a further embodiment not shown in the figures, the first square law detector 41 and/or the second square law detector 42 are replaced by a multiplier.

The inventive frequency-shift keying demodulator 1' described in FIG. 4 comprises a balanced architecture. This balanced architecture is used to eliminate the second item item2 and the third item item3 that degrade the performance of the inventive frequency-shift-keying demodulator 1 according to the above explained first embodiment.

In the above described embodiment it is clear that $$r_1(t)|_{LP}=[s(t)+n(t)+s_d(t)+n_2(t)]^2|_{LP}=\text{item1}+\text{item2}+\text{item3}$$

and $$r_2(t)|_{LP}=[-s(t)-n(t)+s_d(t)+n_2(t)]^2|_{LP}=-\text{item1}+\text{item2}+\text{item3}$$

In consequence, the low-pass filtered signal $r_{LP}(t)$ output by the low pass filter 5 is $$r_{LP}(t)=r_1(t)|_{LP}-r_2(t)|_{LP}=2\cdot\text{item1}.$$

Thus, $$r_{LP}(t) = 4 \cdot \left(\frac{A^2}{2}\sin[2\pi Khm(t)+n_1(t)] + [s(t)\times n_2(t) + s_d(t)\times n(t) + n(t)\times n_2(t)]\right)\bigg|_{LP}.$$

When the term $2\pi Khm(t)$ is small and the noise terms are negligible, this low-pass filtered signal $r_{LP}(t)$ is $$r_{LP}(t) \approx 4\cdot\frac{A^2}{2}\cdot 2\pi Khm(t) = 2\cdot A^2\cdot 2\pi Khm(t).$$

Thus, the transmitted data comprised in the input signal i(t) can be recovered correctly by using the inventive frequency shift-keying demodulator.

It can be concluded that the performance of the inventive frequency-shift-keying demodulator according to the second embodiment shown in FIG. 4 has the same performance as the conventional differential frequency-shift-keying demodulator according to the prior art.

The above frequency-shift-keying demodulator can be applied to any constant envelope modulation schemes, e.g. frequency-shift-keying (FSK), Gaussian frequency-shift-keying (GFSK), minimum shift-keying (MSK), shaped offset quadrature phase shift-keying (SOQPSK) and Gaussian minimum shift-keying (GMSK).

Figure 5:
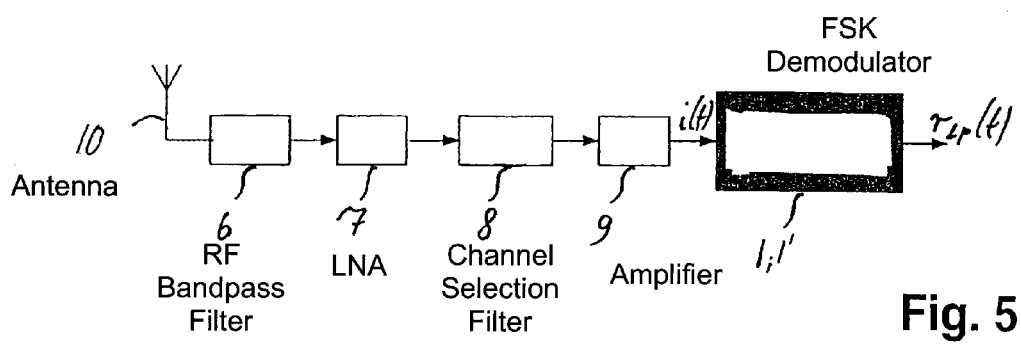
FIG. 5 shows a block diagram of a direct conversion receiver using the inventive frequency-shift-keying demodulator.

As it is shown in the block diagram of FIG. 5 the inventive frequency-shift-keying demodulator 1, 1' shown in FIGS. 3 and 4 can be used in a direct conversion receiver.

Said direct conversion receiver comprises an antenna 10, an RF-bandpass filter 6, a low-noise-amplifier 7, a channel selection filter 8, an amplifier 9 and the inventive frequency-shift-keying demodulator 1, 1' arranged in the order of description.

Figure 1:
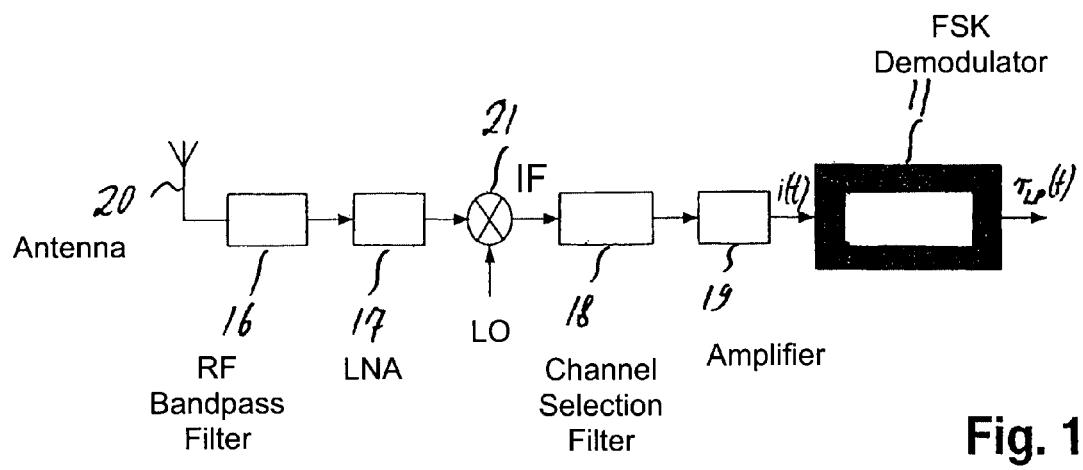
FIG. 1 shows a block diagram of a conventional receiver architecture.
Figure 2:
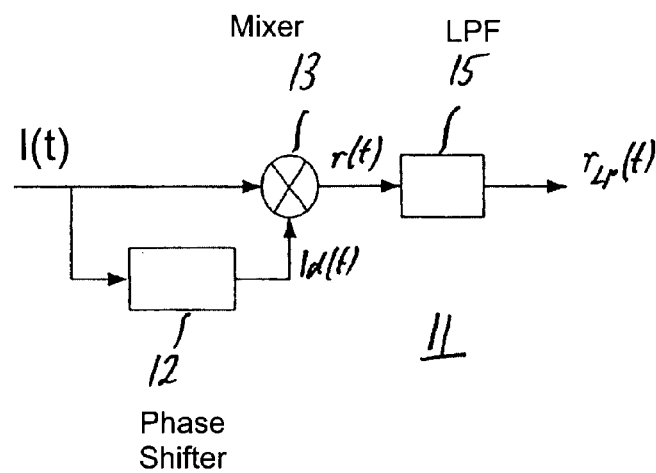
FIG. 2 shows a block diagram of a differential frequency-shift-keying demodulator according to the prior art.

Thus, the inventive frequency-shift-keying demodulator 1, 1' can be used in the RF-range. Therefore, the local oscillator (LO) and the corresponding mixer 21 of the conventional receiver architecture shown in FIG. 1 can be avoided and the whole receiver architecture becomes more simple and consumes less power.

Nevertheless, the inventive frequency-shift-keying demodulators 1, 1' can be used in any conventional receiver architectures (like the architecture shown in FIG. 1), too.

Figure 6:
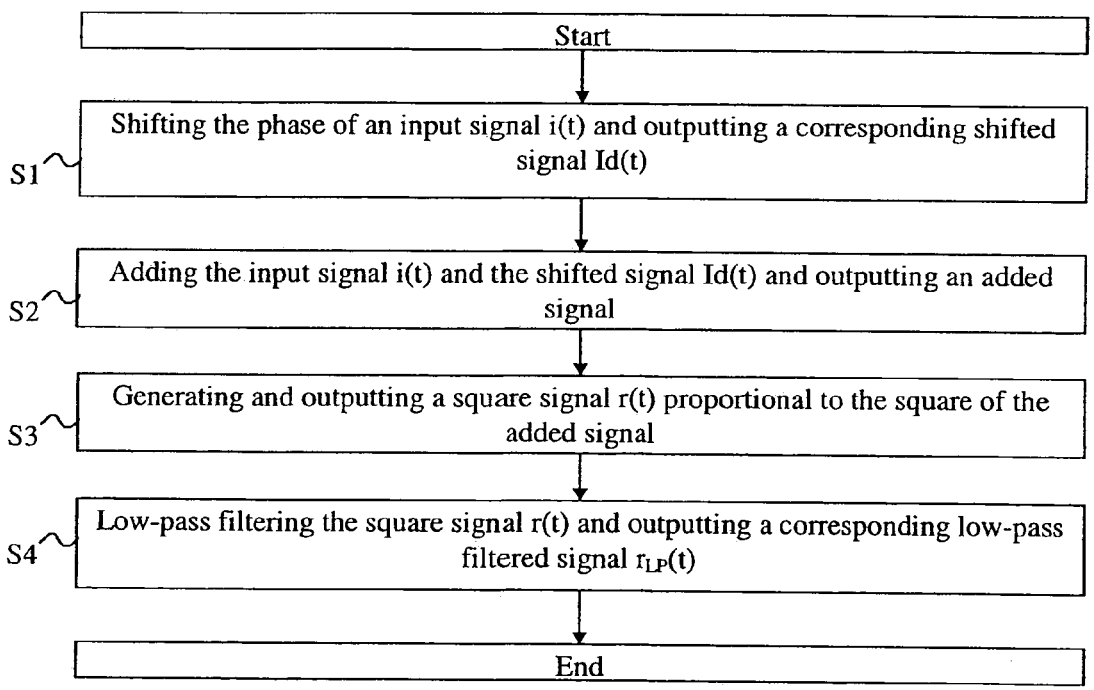
FIG. 6 shows a flow chart of a first embodiment of the inventive method of frequency-shift-keying demodulating an input signal.

In the following, a first embodiment of the inventive method of frequency-shift-keying demodulating an input signal i(t) is described by reference to the flow chart shown in FIG. 6.

In a first step S1 the phase of an input signal i(t) is shifted by a predetermined degree and a shifted signal Id(t) is output.

In a second step S2 the input signal i(t) is added to the shifted signal Id(t) and an added signal is output.

In a following step S3 a squared signal r(t) is generated based on the added signal output in step S2, the squared signal r(t) being proportional to the square of the added signal.

Finally, in step S4 the squared signal r(t) is low-pass filtered and a corresponding low-pass filtered signal $r_{LP}(t)$ is output.

Figure 7:
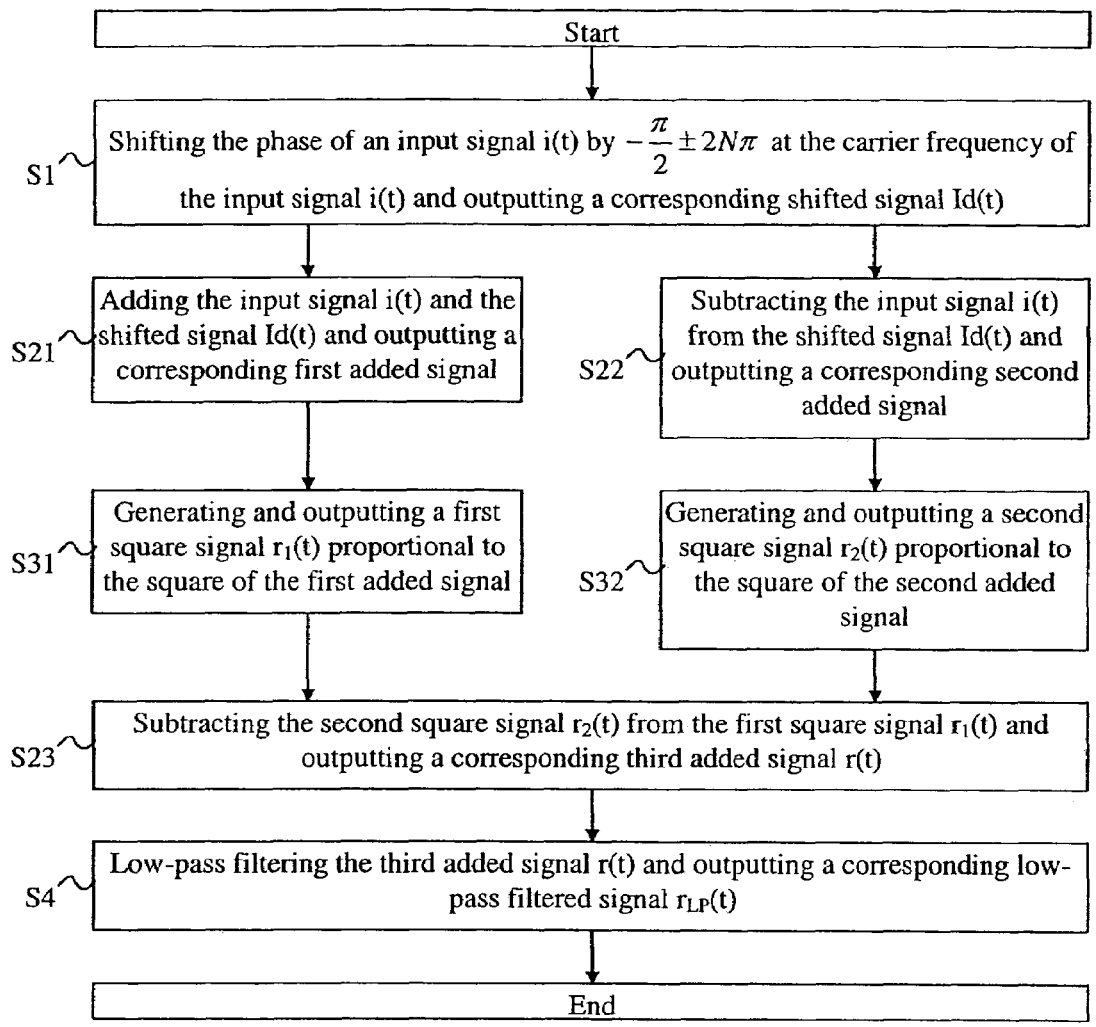
FIG. 7 shows a second preferred embodiment of the inventive method of frequency-shift-keying demodulating an input signal.

FIG. 7 shows a second preferred embodiment of the inventive method of frequency-shift-keying demodulating an input signal i(t).

According to this preferred embodiment, in a first step S1 the phase of an input signal i(t) is shifted by $$-\frac{\pi}{2} \pm 2N\pi$$

at the carrier frequency of the input signal i(t) and a corresponding shifted signal Id(t) is output.

In a following step S21 the input signal i(t) and the shifted signal Id(t) are added and a corresponding first added signal is output.

In a parallel step S22 the input signal i(t) is subtracted from the shifted signal Id(t) by changing the sign of the input signal i(t) before adding the shifted signal Id(t). A corresponding second added signal is output.

In step S31 following step S21 a first squared signal $r_1(t)$ is generated. The first squared signal $r_1(t)$ is the square of the first added signal output in step 21.

In a parallel step S32 following step S22 a second squared signal $r_2(t)$ is generated. The second squared signal $r_2(t)$ is the square of the second added signal output in step S22. After generation the second squared signal $r_2(t)$ is output.

In step S23 following steps S31 and S32 the second squared signal $r_2(t)$ is subtracted from the first squared signal $r_1(t)$ by changing the sign of the second squared signal $r_2(t)$ before adding said signal. A corresponding third added signal r(t) is output.

Afterwards, in step S4 the third added signal r(t) is low-pass filtered and a corresponding low-pass filtered signal $r_{LP}(t)$ is output.

Thus, the above described method allows frequency shift-keying demodulation of a signal without requiring a complicated mixing/multiplying step.

The invention claimed is:

1. A frequency-shift-keying demodulator comprising:
a phase shifter configured to shift a phase of an input signal (i(t)) by a predetermined degree and to output a shifted signal (Id(t));
a combining unit configured to combine the input signal (i(t)) and the shifted signal (Id(t)) and to output a corresponding signal (r(t)); and
a low-pass filter configured to filter the corresponding signal (r(t)) and to output a low-pass filtered signal ($r_{LP}(t)$), wherein the bandwidth of said low-pass filter is matched with the bandwidth of a data signal included in said input signal (i(t)); said combining unit including
a first, a second and a third adder, and
a first and a second square law detector, wherein the first adder is configured to add the input signal (i(t)) and the shifted signal (Id(t)) and to output the first added signal to the first square law detector, the first square law detector being configured to receive the first added signal and to output a first squared signal ($r_1(t)$) which is the square of the first added signal, the second adder is configured to subtract the input signal (i(t)) from the shifted signal (Id(t)) and to output the second added signal to the second square law detector, the second square law detector being configured to receive the second added signal and to output a second squared signal ($r_2(t)$) which is the square of the second added signal, the third adder is configured to subtract the second squared signal ($r_2(t)$) from the first squared signal ($r_1(t)$) and to output a third added signal, and the combining unit is configured to output the third added signal as the corresponding signal to the low-pass filter.

2. The frequency-shift-keying demodulator according to claim 1, wherein
the phase shifter is configured to shift the phase of said input signal (i(t)) by $$\frac{\pi}{2} \pm 2N\pi$$

at a carrier frequency of the input signal (i(t)), where N is an integer.

3. The frequency-shift-keying demodulator according to claim 1, wherein
said phase shifter is a delay line.

4. The frequency-shift-keying demodulator according to claim 1, wherein said first and said second square law detectors are respective multipliers.

5. A method of frequency-shift-keying demodulating an input signal (i(t)), the method comprising:
shifting a phase of an input signal (i(t)) by a predetermined degree and outputting a shifted signal (Id(t));
combining the input signal (i(t)) and the shifted signal (Id(t)) and outputting a corresponding signal (r(t)); and
filtering the corresponding signal (r(t)) and outputting a low-pass filtered signal ($r_{LP}(t)$); wherein
the combining the input signal (i(t)) and the shifted signal (Id(t)) and outputting the corresponding signal (r(t)) includes
adding the input signal (i(t)) and the shifted signal (Id(t)) and outputting a first added signal;
subtracting the input signal (i(t)) from the shifted signal (Id(t)) and outputting a second added signal;
generating and outputting a first squared signal ($r_1(t)$) proportional to the square of the first added signal;
generating and outputting a second squared signal ($r_2(t)$) proportional to the square of the second added signal; and
subtracting the second squared signal ($r_2(t)$) from the first squared signal ($r_1(t)$) and outputting a third added signal as the corresponding signal (r(t)).

6. The method according to claim 5, wherein
the shifting the phase of an input signal (i(t)) by a predetermined degree and outputting a shifted signal (Id(t)) comprises shifting the phase of the input signal (i(t)) by $$\frac{\pi}{2} \pm 2N\pi$$

at a carrier frequency of the input signal (i(t)), where N is an integer.

* * * * *